(12) United States Patent
Urquidi

(10) Patent No.: US 7,049,828 B1
(45) Date of Patent: May 23, 2006

(54) CAPACITIVE SENSOR FOR DETERMINING LINEAR OR ANGULAR POSITION

(75) Inventor: Carlos A. Urquidi, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/071,941

(22) Filed: Mar. 4, 2005

(51) Int. Cl.
*G01R 27/26* (2006.01)

(52) U.S. Cl. ............... 324/662; 324/515; 324/658; 324/660; 324/663

(58) Field of Classification Search .......... 324/662, 324/515, 514
See application file for complete search history.

(56) References Cited

U.S. PATENT DOCUMENTS

| | | | | |
|---|---|---|---|---|
| 3,112,464 A | * | 11/1963 | Ratajski | 338/32 H |
| 4,103,155 A | * | 7/1978 | Clark | 250/231.13 |
| 5,136,286 A | * | 8/1992 | Veneruso | 340/870.37 |
| 5,317,351 A | * | 5/1994 | Takahara et al. | 396/81 |
| 5,708,368 A | * | 1/1998 | Mallory | 324/663 |
| 6,404,185 B1 | * | 6/2002 | Allwine | 324/207.2 |
| 6,492,821 B1 | * | 12/2002 | Marko et al. | 324/671 |
| 6,593,755 B1 | * | 7/2003 | Rosengren | 324/677 |
| 6,653,830 B1 | * | 11/2003 | Luetzow | 324/207.21 |
| 6,700,391 B1 | * | 3/2004 | Strack et al. | 324/662 |
| 6,823,747 B1 | * | 11/2004 | Hasegawa et al. | 73/862.52 |

* cited by examiner

*Primary Examiner*—Anjan Deb
*Assistant Examiner*—John Zhu
(74) *Attorney, Agent, or Firm*—Jimmy L. Funke

(57) ABSTRACT

A capacitive sensor includes an electrode member with two spaced-apart electrodes and an air gap therebetween. A position reference plate, which can be straight for sensing linear position or curvilinear for sensing angular position, is disposed in the air gap, with the electrode member being attached to a moving component and the reference plate mounted on a stationary object or vice-versa. The reference plate is formed with an opening, the width of which varies throughout the length of the opening, so that the capacitance between the electrodes varies depending on the position of the plate relative to the electrode member.

18 Claims, 3 Drawing Sheets

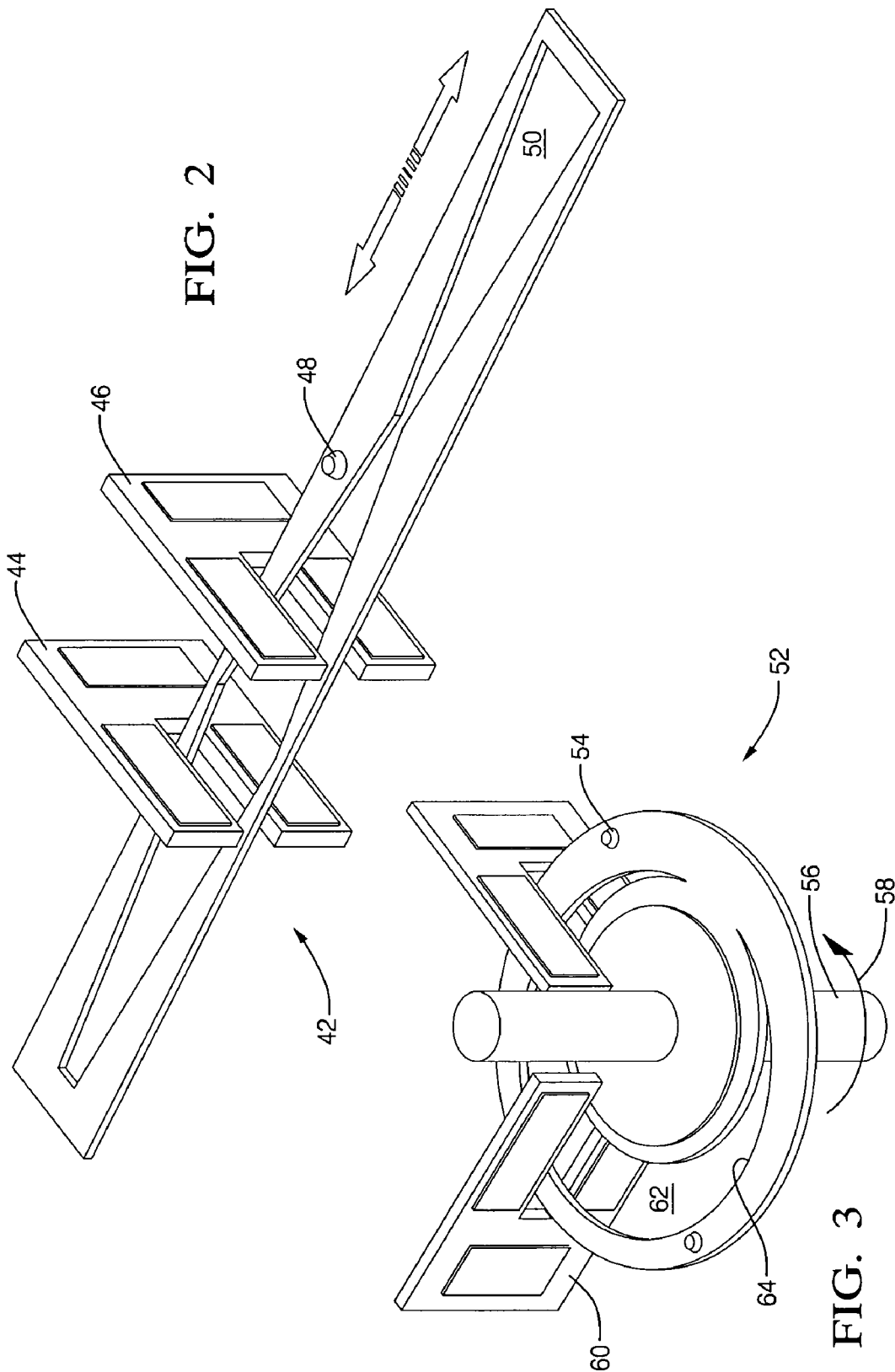

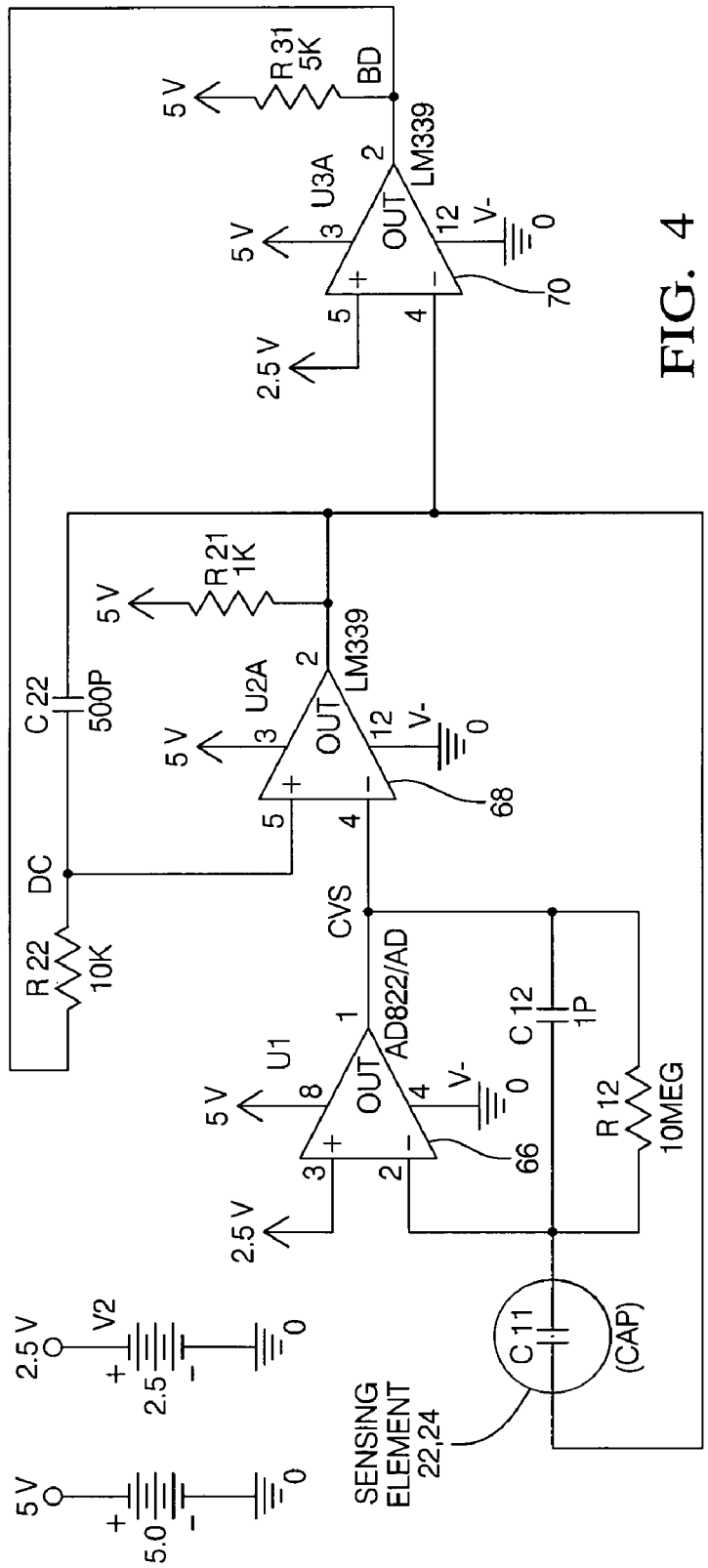
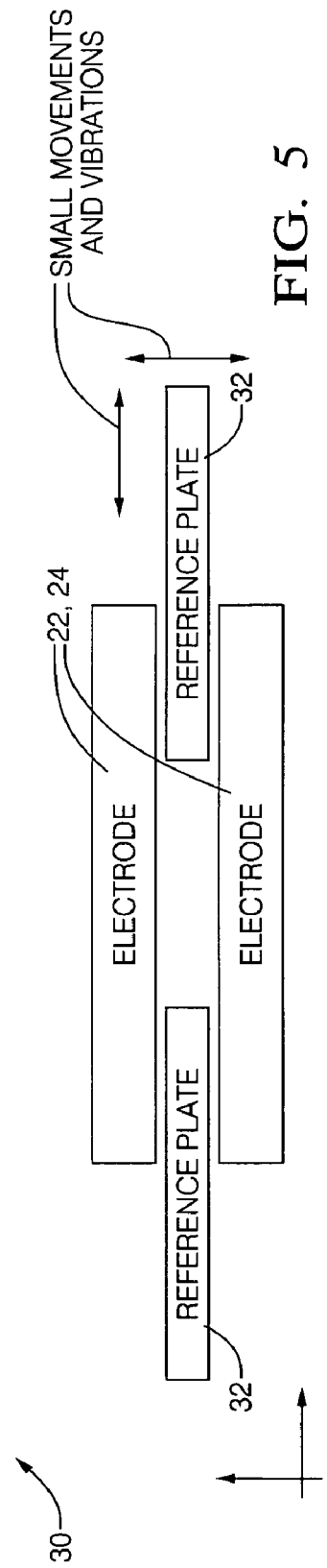
FIG. 4
FIG. 5

US 7,049,828 B1

CAPACITIVE SENSOR FOR DETERMINING LINEAR OR ANGULAR POSITION

FIELD OF THE INVENTION

The present invention relates to position sensors for vehicles.

BACKGROUND OF THE INVENTION

Modern motor vehicles are equipped with numerous vehicle subsystems that are designed to increase the comfort and safety of drivers and passengers. For example, a vehicle can include an anti-lock braking system, a traction control system, a speed control system, and/or a vehicle stability enhancement control system. In turn, each subsystem can include numerous electrically-operated hydraulic actuators that use electric coils to move plungers and thereby direct hydraulic fluid to and from vehicle components such as a brake.

As recognized herein, many such control systems use, as input parameters, position signals, e.g., the angular position of the steering column. Accordingly, sensors have been developed to generate signals representative of the positions of various vehicle components for input to, e.g., a control processor such as an engine control module (ECM). As further recognized herein, many of these sensors require contact between moving parts of the sensor, which wears out the sensor. Other sensors are susceptible to temperature-induced errors, and to manufacturing variations that also cause errors in sensor output. Further, many sensors require rather involved calibration, and can experience degraded performance under conditions of vibration and contamination, both of which are factors in vehicle applications. With the above considerations in mind, the invention is provided.

SUMMARY OF THE INVENTION

The present sensor enhances performance by reducing and/or eliminating dimensional variables, temperature variations, pre-calibrations, and contamination that impact the sensor output.

Accordingly, a system for outputting signals representative of the position of a first component relative to a second component includes at least one electrode member having at least two spaced-apart electrodes and an air gap therebetween. The electrode member is attached to the first component. A position reference member is disposed in the air gap and is attached to the second component. The reference member is formed with an opening defining a length and a width varying along the length. With this structure, the capacitance between the electrodes depends on the position of the reference member relative to the electrode member.

In some implementations the reference member is straight for sensing linear position. In other implementations the reference member is curvilinear for sensing angular position. A circuit may be connected to the electrodes for converting a capacitance related to the electrodes to an electrical signal.

In specific non-limiting implementations the electrodes can be respectively disposed on opposed arms of a generally U-shaped substrate, which may be implemented by a printed circuit board (PCB). The circuit may be supported on the circuit board. The first and second components can be vehicle components.

In another aspect, a method for sensing the relative position between first and second vehicle components includes engaging first and second electrodes to the first component, and engaging a reference member to the second component. The reference member is disposed between the electrodes without touching the electrodes. As set forth further below, the reference member changes a capacitance associated with the electrodes in response to relative motion between the first and second components.

In yet another aspect, a device for sensing the position of a first vehicle component relative to a second vehicle component includes capacitance means for generating a capacitance signal. The capacitance means is attached to the first vehicle component and defines an air gap. Capacitance altering means are at least partially disposed in the air gap and are attached to the second vehicle component but do not touch the capacitance means for causing the capacitance signal to vary as the position of the first vehicle component relative to the second vehicle component varies.

The present invention will now be described, by way of example, with reference to the accompanying drawings, in which:

BRIEF DESCRIPTION OF THE DRAWINGS

FIG. 2 is a perspective view of a second embodiment of the sensor configured for sensing linear position;

FIG. 3 is a perspective view of a third embodiment of the sensor configured for sensing angular position;

FIG. 4 is an electrical schematic of one non-limiting circuit for processing the position signal from the sensor; and FIG. 5 is a schematic cross-section of the reference member and electrodes taken in the y-z plane.

DESCRIPTION OF AN EMBODIMENT OF THE INVENTION

Figure 1:
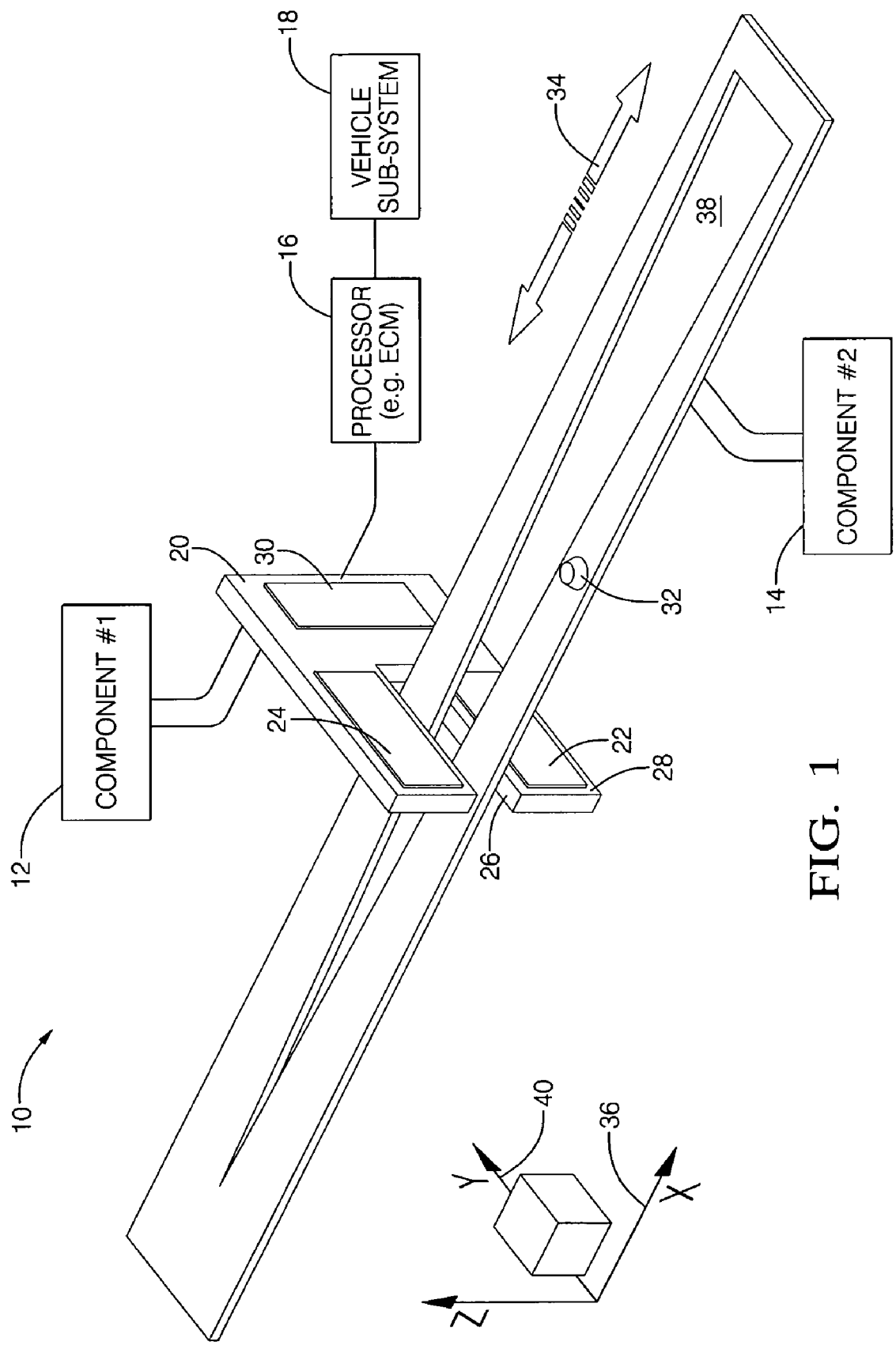
FIG. 1 is a perspective view of a first embodiment of the sensor configured for sensing linear position.

Referring initially to FIG. 1, a position sensing system is shown, generally designated 10, which can be used to sense the linear position of a first component 12 relative to the position of a second component 14. Other embodiments disclosed further below can be used to sense angular position of a rotating component. In any case, the components 12, 14 may be vehicle components, one of which moves relative to the other. By way of non-limiting example, the first component 12 may be a "fixed" component such as a vehicle chassis or a component housing mounted on the chassis, while the second component 14 may be a moving component such as a brake or accelerator pedal, suspension component, or any other linearly moving component the position of which is used by a processor 16 such as an engine control module (ECM) to control a vehicle subsystem 18 such as a stability control system, ABS, etc. Other vehicle subsystems are encompassed herein. For the below-described angular motion embodiment, the second component 14 may be, e.g., a steering column of a vehicle or a crankshaft or other rotating part for which it is desired to know the angular position. It is to be understood that the second component 14 alternatively can be the "fixed" component and the first component 12 can be the moving component.

In any case, an electrode member 20 is affixed or otherwise coupled to the first component 12 for movement therewith. In the embodiment shown in FIG. 1, the electrode member 20 has at least two spaced apart, possibly co-planar, potentially rectangular electrodes 22, 24, and the electrode member 20 defines an air gap 26 between the electrodes 22, 24. This renders the electrode member 20 generally U-shaped as shown.

The electrodes 22, 24 are mounted on a substrate 28 that may be implemented by a printed circuit board (PCB). Two additional electrodes (not shown) can be on the surfaces of the substrate 28 that are opposed to the electrodes 22, 24. When a PCB is used as the substrate, the electrodes may be implemented as copper traces. The electrodes generate E-fields between them which drive the capacitance that is measured as more fully disclosed below. The capacitance depends on the area of the electrodes and the distance that is between them, as well as on below-described structure in the air gap 26. The present invention understands that PCBs advantageously can be made of standard materials with considerable dimensional precision and manufacturability to reduce dimensional variations that may otherwise impact the performance of the sensor. The use of PCBs also facilitates mass production.

Also, on the cross-bar of the generally U-shaped electrode member 20, an electrical circuit 30 such as but not limited to the circuit shown in FIG. 4 and described further below may be disposed. The electrical circuit 30 is electrically connected to the electrodes 22, 24 to transform a capacitance signal from the electrodes 22, 24 into an electrical signal, such as a digitized frequency signal, that may be sent to the processor 16 as a representation of the position of the first component 12 relative to the second component 14.

Still referring to FIG. 1, a reference member 32 is disposed in the air gap 26 for relative motion therethrough. Preferably, the reference member 32 is at the same ground as is used by the circuit 30, so that the capacitance of the sensing element is varied by blocking and grounding the e-field lines as the reference member 32 moves along the x-axis indicated by the arrows 34. Thus, the relative motion between the electrode member 20 and reference member 32 is linear and is in the x-dimension 36. Consequently, since relative linear position is to be sensed by the sensor 10 shown in FIG. 1, the reference member 32 is flat and straight, defining a rectangular object. The reference member 32 may be implemented by a metal plate.

As shown in FIG. 1, the reference member 32 is formed with an opening 38 in the middle of the reference member 32. The opening 38 is formed completely through the reference member 32 as shown, and it defines a length in the x-dimension and a width in the y-dimension 40 that varies constantly along the length of the opening. In the non-limiting embodiment shown in FIG. 1, the opening 38 is triangular. In any case, the reference member 32 does not contact the electrode member 20.

With the above disclosure in mind, it may now be appreciated that as one of the components 12, 14 moves relative to the other component 14, 12, the reference member 32 moves through the air gap 26 of the electrode member 20, resulting in varying the capacitance that is developed between the electrodes 22, 24 owing to the changing width of the opening 38 of the reference member 32. The capacitance is converted by the electrical circuit 30 into a relative position signal for use thereof by the processor 16. The skilled artisan will recognize that calibration of the sensor 10 can be undertaken by incrementally moving the reference member 32 through the air gap 26 and measuring the output signal of the circuit 30 at each incremental position to develop a correlation data structure that can be accessed subsequently to correlate signals from the electrical circuit 30 to relative position of the first component 12 with respect to the second component 14.

Further, referring briefly to FIG. 5, the configuration disclosed above is not sensitive to small movements and noise vibration (indicated by the arrows in FIG. 5) of the reference member 32 in the y- and z-dimensions. This is because, as shown in FIG. 5, the gap between the cross-section of the reference member 32 does not change relative to the electrodes 22, 24 for small movements in the y- and z-dimensions.

FIG. 2 shows a sensor 42 that is in all essential respects identical to the sensor 10 shown in FIG. 1, with the following exceptions. First and second electrode members 44, 46 are arranged along the x-axis, and a reference member 48 extends through the air gaps of each. Having two electrode members 44, 46 increases the resolution and precision of the sensor 42 relative to that of a single electrode member sensor. Also, the continuous opening 50 of the reference member 48 may be more complex than the opening shown in FIG. 1. In the non-limiting embodiment shown, the opening 50 forms, from left to right, a first triangular portion which merges at its base with the base of a second triangular portion, which in turn merges at its apex with the apex of a third triangular portion as shown. As understood herein, the configuration of the opening 50 shown in FIG. 2, like that shown in FIG. 1 and explained above, advantageously avoids variations in output that might otherwise be caused by motion on the Y and Z-axes.

In both sensors shown in FIGS. 1 and 2, the fact that the E-field extends through air and not through some material promotes output signal stability in the presence of temperature variations since the dielectric constant of air is largely unaffected by temperature variations.

FIG. 3 shows that instead of a straight reference member useful for linear position sensing, a sensor 52 can have a curvilinear (indeed circular) reference member 54 that is attached to a component 56 which rotates as indicated by the arrow 58, for outputting a signal representative of the angular position of the component 56 relative to a component that holds one or more electrode members 60. As before, the reference member 54 extends through the air gap(s) of the electrode member(s) 60, and is formed with an opening 62 the width of which varies with the azimuthal length of the opening. The shape of the opening 62 is curvilinear, and the opening 62 may be formed in part by a spiral-shaped outer edge 64 as shown. The inner edge of the opening may be circular or spiral-shaped. The non-limiting opening 62 shown in FIG. 3 can taper from a large width portion to two smaller width portions that are juxtaposed with each other as shown.

FIG. 4 illustrates a non-limiting implementation of the circuit 30 that can be used to convert capacitance signals from the electrodes 22, 24 shown in FIG. 1 to electrical signals representing relative positions between two components useful by the processor 16, it being understood that the circuit 30 shown in FIG. 4 may be used with the other sensors shown and described herein. It must be further understood that the electrical element numerals, designations, and values shown in FIG. 4 are exemplary only and in no way limiting on the present invention.

As shown, the capacitance signal, represented by the capacitor symbol "C11" in FIG. 4, may be sent to a first operational amplifier 66 and then to a second operational amplifier 68. The second operational amplifier 68 provides input to a third operational amplifier 70, the output of which may be fed back through a resistor R22 to the input of the second operational amplifier 68. Also, one side of the capacitor C11 is connected between the second and third operational amplifiers 68, 70 as shown. The output signals of the circuit 30 may be digitized and provided to the processor 16 shown in FIG. 1.

With the above disclosure in mind, it may now be appreciated that the present capacitance sensor does not require contact between moving parts of the sensor, and employs relatively simple hardware. Also, the circuit shown in FIG. 4 can employ relatively low cost active electronic components. Manufacturability variations are reduced, as are temperature variations, and calibration is relatively simple. The sensor can be configured for different configurations.

While the particular CAPACITIVE SENSOR FOR DETERMINING LINEAR OR ANGULAR POSITION as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A system for outputting signals representative of the position of a first component relative to a second component, comprising:
   at least one electrode member having at least two spaced-apart electrodes and an air gap therebetween, the electrode member being attached to the first component; and
   at least one position reference member disposed in the air gap and attached to the second component, the reference member being formed with an opening defining a length and a width varying along the length, whereby the capacitance between the electrodes depends on the position of the reference member relative to the electrode member.

2. The system of claim 1, wherein the reference member is straight for sensing linear position.

3. The system of claim 1, wherein the reference member is curvilinear for sensing angular position.

4. The system of claim 1, comprising at least one electrical circuit connected to the electrodes for converting a capacitance related to the electrodes to an electrical signal.

5. The system of claim 4, wherein the electrodes are respectively disposed on opposed arms of a generally U-shaped substrate.

6. The system of claim 5, wherein the substrate is an electrical circuit board.

7. The system of claim 6, wherein the circuit is supported on the circuit board.

8. The system of claim 1, comprising the first and second components, the components being vehicle components.

9. A method for sensing the relative position between first and second components, comprising:
   engaging at least first and second electrodes to the first component; and
   engaging at least one reference member to the second component, the reference member being disposed between the electrodes without touching the electrodes and formed with an opening defining a length and a width varying along the length for changing a capacitance associated with electrodes in response to relative motion between the first and second components, whereby the capacitance between the electrodes depends on the position of the reference member relative to the electrodes.

10. The method of claim 9, wherein the reference member is straight for sensing linear position.

11. The method of claim 9, wherein the reference member is curvilinear for sensing angular position.

12. The method of claim 9, comprising connecting at least one electrical circuit to the electrodes for converting a capacitance related to the electrodes to an electrical signal.

13. The method of claim 9, wherein the electrodes are respectively disposed on opposed arms of a generally U-shaped substrate.

14. The method of claim 13, wherein the substrate is an electrical circuit board.

15. A device for sensing the position of a first component relative to a second component, comprising:
   capacitance means for generating a capacitance signal, the capacitance means being attached to the first component and established at least in part by an electrode member having at least two space-apart electrodes defining an air gap therebetween; and
   capacitance altering means at least partially disposed in the air gap and attached to the second component, the capacitance altering means established at least in part by a position reference member formed with an opening defining a length and a width varying along the length but not touching the capacitance means for causing the capacitance signal to vary as the position of the first component relative to the second component varies.

16. The device of claim 15, wherein the reference member is straight for sensing linear position.

17. The device of claim 15, wherein the reference member is curvilinear for sensing angular position.

18. The device of claim 15, wherein the electrodes are respectively disposed on opposed arms of a generally U-shaped circuit board.

* * * * *